US006053036A

United States Patent [19]

Uto et al.

[11] Patent Number: 6,053,036

[45] Date of Patent: Apr. 25, 2000

[54] FUEL SUPPLY AMOUNT CONTROL SYSTEM FOR INTERNAL COMBUSTION ENGINES

[75] Inventors: Hajime Uto; Toshiaki Ichitani, both of Wako, Japan

[73] Assignee: Honda Giken Kogyo Kabushiki Kaisha, Tokyo, Japan

[21] Appl. No.: 09/111,199

[22] Filed: Jul. 7, 1998

[30] Foreign Application Priority Data

Jul. 15, 1997 [JP] Japan ..................................... 9-20396

[51] Int. Cl.[7] ..................................................... G01M 15/00

[52] U.S. Cl. ........................ 73/119 A; 73/118.1; 701/103

[58] Field of Search .................................... 73/116, 117.2, 73/117.3, 118.1, 118.2, 119 A, 40; 701/103, 104, 108, 109

[56] References Cited

U.S. PATENT DOCUMENTS

| | | | |
|---|---|---|---|
| 4,432,228 | 2/1984 | Kuschmierz et al. | 73/119 A |
| 5,146,902 | 9/1992 | Cook et al. | 73/118.1 |
| 5,474,052 | 12/1995 | Aquino et al. | 701/103 |
| 5,739,421 | 4/1998 | Iochi et al. | 73/118.1 |
| 5,750,888 | 5/1998 | Matsumoto et al. | 73/118.1 |

*Primary Examiner*—George Dombroske

*Attorney, Agent, or Firm*—Frishauf, Holtz, Goodman, Langer & Chick, P.C.

[57] ABSTRACT

An fuel supply amount control system for an internal combustion engine comprises an evaporative fuel passage extending between the fuel tank and the intake system of the engine, and a control valve arranged across the evaporative fuel passage, for opening and closing the evaporative fuel passage. A pressure sensor detects pressure within the fuel tank. The opening of the control valve is controlled such that the interior of the fuel tank is held under negative pressure. After termination of negative pressurization of the fuel tank, the amount of fuel supplied to the engine is increased according to an amount of increase in the pressure within the fuel tank detected by the pressure sensor.

6 Claims, 7 Drawing Sheets

FUEL SUPPLY AMOUNT CONTROL SYSTEM FOR INTERNAL COMBUSTION ENGINES

BACKGROUND OF THE INVENTION

1. Field of the Invention

This invention relates to a fuel supply amount control system for internal combustion engines, and more particularly to a fuel supply amount control system which is provided with an evaporative emission control system for controlling the internal pressure of the fuel tank to negative pressure.

2. Description of Related Art

To prevent evaporative fuel generated in the fuel tank of an internal combustion engine installed in a vehicle from being emitted into the atmosphere, there has already been proposed an evaporative emission control system for internal combustion engines, for example, by U.S. patent application Ser. No. 09/021,004, assigned to the assignee of the present application. The proposed system negatively pressurizes the interior of the fuel tank during operation of the engine so as to hold the interior of the fuel tank under negative pressure not only during operation of the engine but also during stoppage of the same, to thereby prevent evaporative fuel within the fuel tank from being emitted into the atmosphere, even if a filler cap of the fuel tank is removed for refueling.

The proposed system includes an evaporative fuel passage extending between the fuel tank and the intake pipe of the engine, a control valve arranged across the evaporative fuel passage, for opening and closing the same, a temperature sensor which detects the temperature of fuel within the fuel tank, and a tank internal pressure sensor which detects the pressure within the fuel tank (hereinafter referred to as "the tank internal pressure"), to set a desired pressure value within the fuel tank to an excessively negative value, i.e. a value lower than the actually required value according to the temperature of fuel within the fuel tank, in view of an expected increase in the tank internal pressure. Further, the opening of the control valve is feedback-controlled in response to an output from the tank internal pressure sensor to control the tank internal pressure by using negative pressure in the intake pipe prevailing during operation of the engine, such that the tank internal pressure becomes equal to the desired pressure value. Thus, the tank internal pressure is normally controlled to and held at the desired pressure value.

In the negatively pressurized fuel tank, immediately after termination of negative pressurization of the fuel tank, volatile ingredients of fuel, which evaporate at temperatures lower than the detected fuel temperature, evaporate due to heat held by the fuel at the fuel temperature, and accordingly the tank internal pressure increases in proportion to the amount of evaporation of the volatile ingredients. The manner of increase in the tank internal pressure is shown in FIG. 1.

As is apparent from FIG. 1, when fuel contains a large amount of low boiling point ingredients, the tank internal pressure increases at a large rate after completion of negative pressurization of the fuel tank, as indicated by a curve A, while when fuel contains a small amount of low boiling point ingredients, the tank internal pressure increases at a small rate, as indicated by a curve B in FIG. 1.

Therefore, by detecting the amount of increase in the tank internal pressure after completion of negative pressurization of the fuel tank, it can be estimated to what degree the volatile ingredients of fuel within the fuel tank have evaporated, i.e. the deterioration degree of the fuel. The deterioration degree means a degree of difficulty of maintaining properties as fuel, which is determined by the degree of evaporation of the volatile ingredients.

In the proposed evaporative emission control system, however, the fuel tank is normally or always held under negative pressure. Therefore, fuel within the fuel tank can become deteriorated with the lapse of time. Supply of the deteriorated fuel, which is poor in volatility, to the engine can cause degraded drivability of the engine especially during a time period after cranking but before completion of warming-up of the engine. Besides, the same inconvenience also occurs where fuel for use in summer containing a small amount of low boiling point ingredients is used in winter.

SUMMARY OF THE INVENTION

It is the object of the invention to provide a fuel supply amount control system for internal combustion engines, which is capable of securing required drivability of the engine even if fuel within the fuel tank is deteriorated or contains a reduced amount of low boiling point ingredients.

To attain the object, the present invention provides a fuel supply amount control system for an internal combustion engine having a fuel tank, and an intake system, comprising:

- an evaporative fuel passage extending between the fuel tank and the intake system;
- a control valve arranged across the evaporative fuel passage, for opening and closing the evaporative fuel passage;
- a pressure sensor for detecting pressure within the fuel tank;
- negative pressurization control means for controlling opening of the control valve such that an interior of the fuel tank is held under negative pressure; and
- fuel supply amount control means for controlling an amount of fuel supplied to the engine;
- the fuel supply control means being operable after termination of negative pressurization of the fuel tank by the negative pressurization control means, for increasing the amount of fuel supplied to the engine according to an amount of increase in the pressure within the fuel tank detected by the pressure sensor.

Preferably, the fuel supply amount control means increases the amount of fuel supplied to the engine by a larger amount as the amount of increase in the pressure within the fuel tank is smaller.

More preferably, the fuel supply amount control system includes a temperature sensor for detecting temperature of fuel within the fuel tank, the fuel supply amount control means increasing the amount of fuel supplied to the engine by a larger amount as the temperature of the fuel detected by the temperature sensor is lower.

Advantageously, the fuel supply amount control means carries out the increasing of the amount of fuel supplied to the engine during a time period after starting of the engine but before completion of warming-up of the engine.

The above and other objects, features, and advantages of the invention will be more apparent from the following detailed description taken in conjunction with the accompanying drawings.

DETAILED DESCRIPTION

The invention will now be described in detail with reference to the drawings showing an embodiment thereof.

Figure 1:
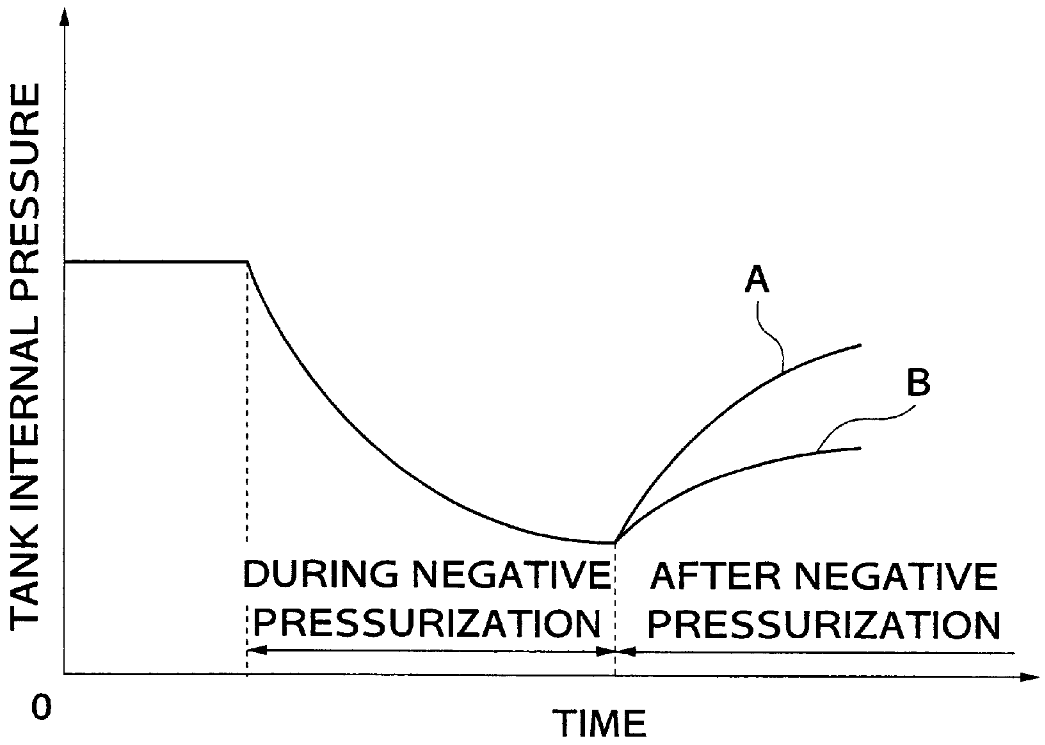
FIG. 1 is a graph showing changes in pressure within a fuel tank of an internal combustion engine with the lapse of time, depending on the degree of deterioration of fuel within the fuel tank.
Figure 2:
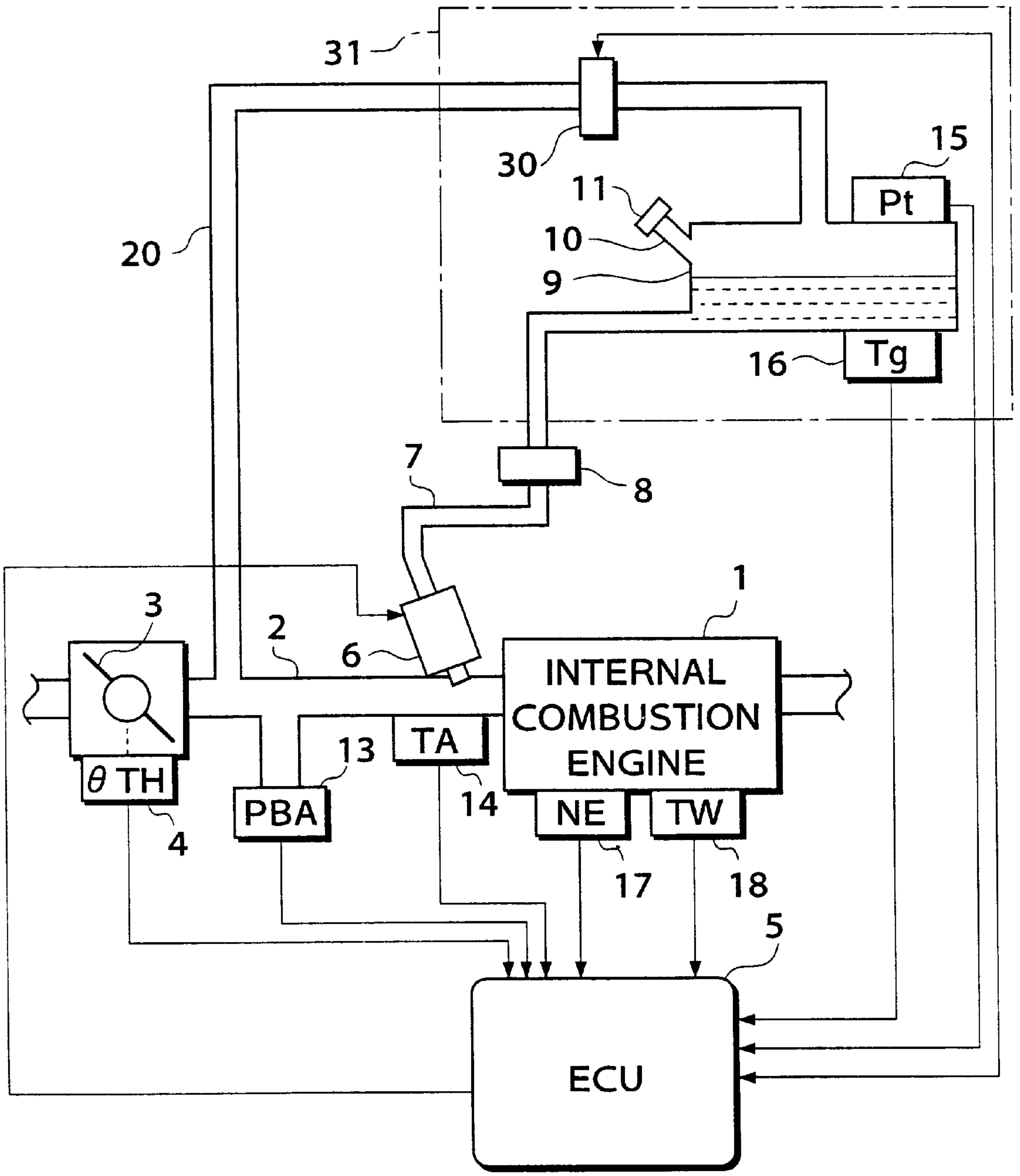
FIG. 2 is a block diagram schematically showing the arrangement of an internal combustion engine and a fuel supply amount control system therefore, according to an embodiment of the invention.

Referring first to FIG. 2, there is illustrated the arrangement of an internal combustion engine and a fuel supply amount control system therefore, according to an embodiment of the invention.

In the figure, reference numeral 1 designates an internal combustion engine (hereinafter simply referred to as "the engine") having four cylinders, not shown, for instance. Arranged in an intake pipe 2 of the engine is a throttle valve 3. A throttle valve opening (θTH) sensor 4 is connected to the throttle valve 3, for generating an electric signal indicative of the sensed throttle valve opening θTH to an electronic control unit (hereinafter referred to as "the ECU") 5.

Fuel injection valves 6, only one of which is shown, are each provided for each cylinder and arranged in the intake pipe 2 at a location intermediate between the engine 1 and the throttle valve 3 and slightly upstream of an intake valve, not shown. The fuel injection valves 6 are connected to a fuel tank 9 via a fuel supply pipe 7 with a fuel pump 8 arranged thereacross. The fuel tank 9 has a fuel inlet 10 for refueling, or which is mounted a filler cap 11.

The fuel injection valves 6 are electrically connected to the ECU 5 to have their valve opening periods controlled by signals therefrom.

An intake pipe absolute pressure (PBA) sensor 13 and an intake air temperature (TA) sensor 14 are inserted into the intake pipe 2 at locations downstream of the throttle valve 3. The PBA sensor 13 detects absolute pressure PBA within the intake pipe 2, and the TA sensor 14 detects intake air temperature TA as outside air temperature. An engine coolant temperature (TW) sensor 18 formed of a thermistor or the like is mounted in the cylinder block of the engine 1.

Inserted into the fuel tank 9 are a tank internal pressure (Pt) sensor 15 for detecting tank internal pressure (absolute pressure: mmHg) Pt, and a fuel temperature (Tg) sensor 16 for detecting temperature Tg of fuel in the fuel tank 9.

An engine rotational speed (NE) sensor 17 is arranged in facing relation to a camshaft or a crankshaft of the engine 1, neither of which is shown, for generating a TDC signal pulse at each of predetermined crank angles whenever the crankshaft rotates 180 degrees. Signals indicative of the sensed parameter values from the sensors 13 to 18 are supplied to the ECU 5.

Next, an evaporative emission control system 31 will be described, which is comprised of the fuel tank 9, an evaporative fuel passage 20, a control valve 30, etc.

The fuel tank 9 is connected through the evaporative fuel passage 20 to the intake pipe 2 at a location downstream of the throttle valve 3. The control valve 30 is arranged across the evaporative fuel passage 20, for opening and closing the passage 20 to control the tank internal pressure Pt. The control valve 30 is an electromagnetic valve which has its opening controlled according to the on-off duty ratio of a control signal supplied from the ECU 5 to control the flow rate of evaporative fuel to be supplied from the fuel tank 9 to the intake pipe 2 for negative pressurization of the fuel tank. Alternatively, the control valve 30 may be formed by an electromagnetic valve which has its opening linearly changed.

The ECU 5 is comprised of an input circuit having the functions of shaping the waveforms of input signals from various sensors, shifting the voltage levels of sensor output signals to a predetermined level, converting analog signals from analog-output sensors to digital signals, and so forth, a central processing unit (hereinafter referred to as "the CPU"), a memory circuit storing various operational programs which are executed by the CPU as well as maps, tables, coefficients, etc. and for storing results of calculations therefrom, etc., and an output circuit which delivers driving signals to the fuel injection valves 6, the control value 30, etc.

The CPU of the ECU 5 operates in response to signals from various sensors including the θTH sensor 4, the PBA sensor 13, the NE sensor 17, and the TW sensor 18, to calculate opening of the control valve 30 and a fuel injection period TOUT over which each fuel injection valve 6 is to be opened, in response to output signals from the sensors. Further, the CPU of the ECU 5 delivers signals for driving the control valve 30 and the fuel injection valves 6 via the output circuit, based on results of the above calculations.

Figure 3:
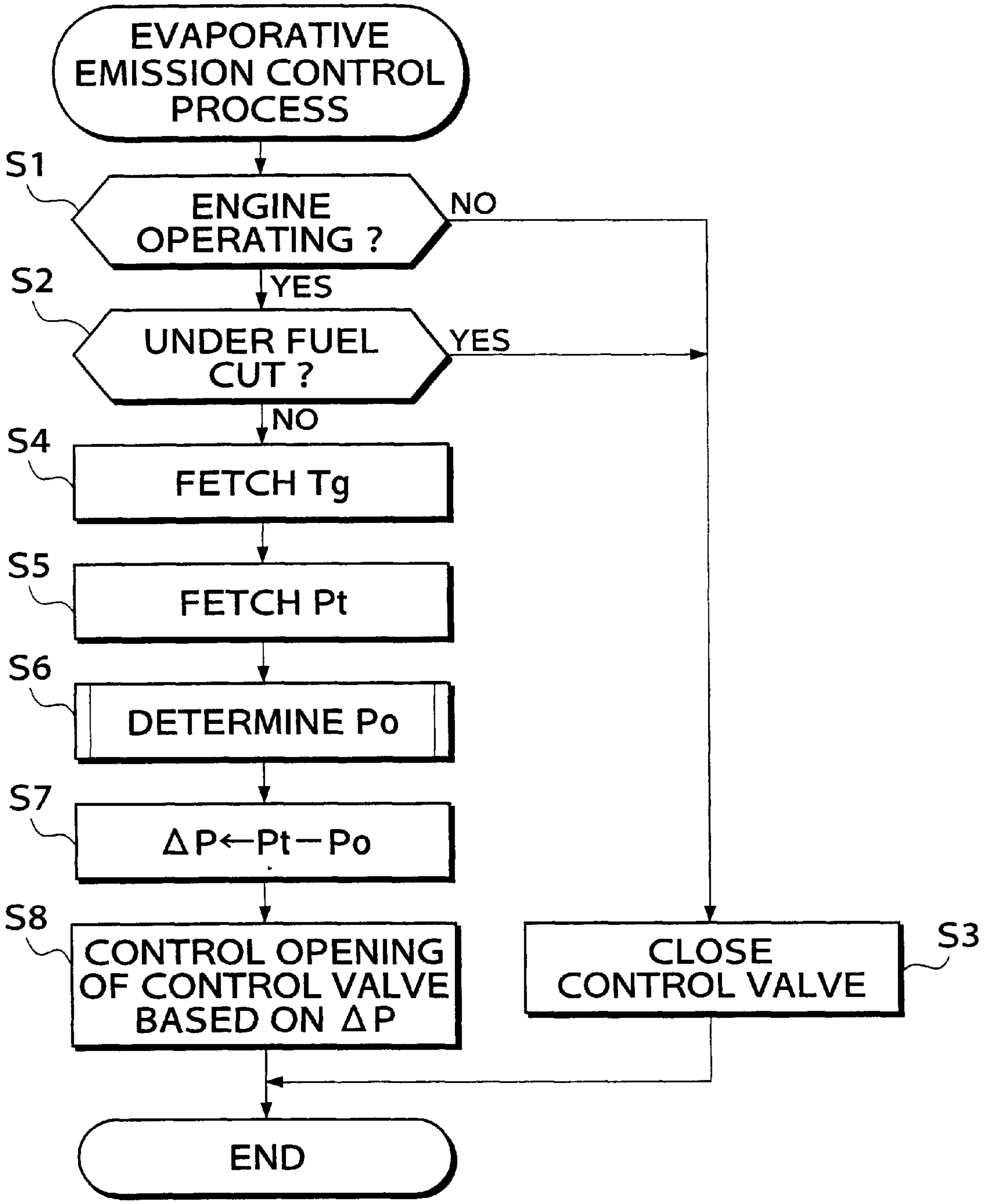
FIG. 3 is a flowchart showing a routine for carrying out an evaporative emission control process.

FIG. 3 shows a routine for carrying out an evaporative emission control process according to the present embodiment, which is executed whenever a TDC signal pulse is generated.

First, at a step S1, it is determined whether or not the engine 1 is operating, e.g. by detecting cranking of the engine 1, and then it is determined at a step S2 whether or not the engine 1 is under fuel cut. If it is determined at the step S1 or S2 that the engine 1 is in stoppage or under fuel cut, the control valve 30 is closed at a step S3 so as to maintain negative pressure within the fuel tank 9, which has been controlled to a desired pressure value Po, referred to hereinafter, followed by terminating the present routine.

On the other hand, if it is determined at the steps S1 and S2 that the engine 1 is operating and at the same time not under fuel cut, a value of the fuel temperature Tg in the fuel tank 9 detected by the Tg sensor 16 is fetched at a step S4, and a value of the tank internal pressure Pt detected by the Pt sensor 15 is fetched at a step S5.

Further, at a step S6, the desired pressure value (absolute pressure: mmHg) Po within the fuel tank 9 is determined based on the fuel temperature Tg in the fuel tank 9 and the tank internal pressure Pt. The desired pressure value Po is, as described, for example, in U.S. patent application Ser. No. 09/021,004, a value at or below which the interior of the fuel tank 9 is excessively negatively pressurized to a higher degree than the actually required negative pressure in view of an expected increase in the tank internal pressure Pt so that the interior of the fuel tank 9 can be held under negative pressure even during stoppage of the engine 1. Such an expected increase in the tank internal pressure Pt is caused by the following factors: That is, the fuel contains volatile ingredients, which evaporate at temperatures lower than the fuel temperature, evaporate due to heat held by the fuel at the fuel temperature, and part of the fuel evaporates with a rise in the fuel temperature caused by a rise in the outside air temperature TA. The description of the manner of determining the desired pressure value Po is omitted.

Then, a difference ΔP between the tank internal pressure Pt and the desired pressure value Po is calculated at a step S7, and the opening of the control valve 30 is controlled such that the difference ΔP becomes equal to 0 at a step S8, followed by terminating the present routine.

According to the process of FIG. 3 described above, when the engine 1 is operating, the opening of the control valve 30 is controlled to introduce the negative pressure in the intake pipe 2 into the fuel tank 9 so as to control and hold the tank internal pressure Pt to and at the desired pressure value Po. As a result, the fuel tank 9 is held under negative pressure not only during operation of the engine 1 but also during stoppage of the same, whereby it is possible to prevent evaporative fuel in the fuel tank 9 from being emitted into the atmosphere even if the filler cap 11 is removed for refueling.

Figure 4:
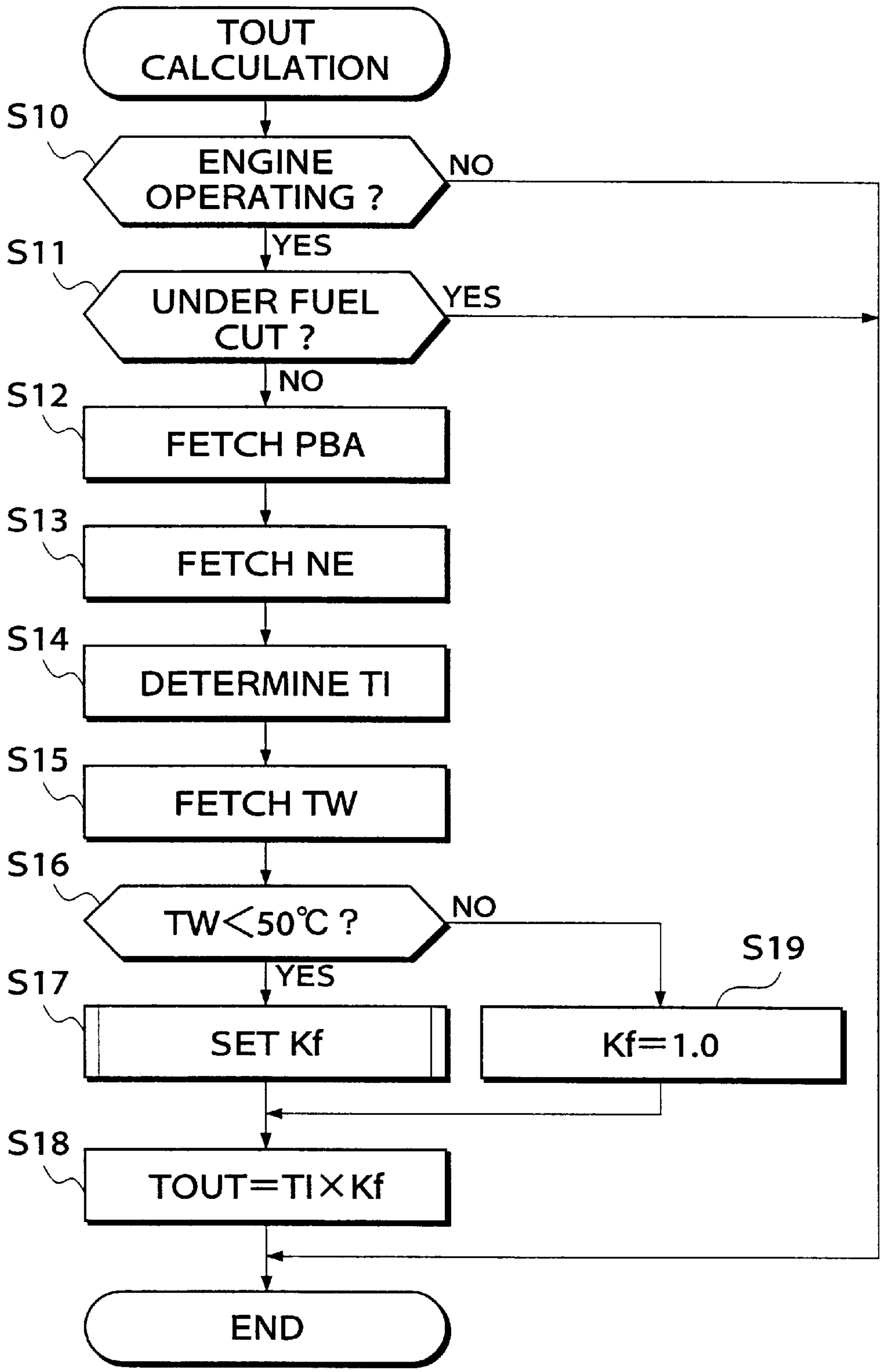
FIG. 4 is a flowchart showing a routine for calculating a fuel injection period TOUT.

FIG. 4 shows a routine for calculating the fuel injection period TOUT of the fuel injection valve 6, according to the present embodiment. This routine is executed in synchronism with execution of the FIG. 3 routine.

First, at a step S10, it is determined whether or not the engine 1 is operating, e.g. by detecting cranking of the engine 1, and then it is determined at a step S11 whether or not the engine 1 is under fuel cut. If it is determined at the step S10 or S11 that the engine 1 is in stoppage or under fuel cut, the program is immediately terminated.

On the other hand, if it is determined at the steps S10 and S11 that the engine 1 is operating and at the same time not under fuel cut, a value of the intake pipe absolute pressure PBA detected by the PBA sensor 13 is fetched at a step S12, and a value of the engine rotational speed NE detected by the NE sensor 17 is fetched at a step S13.

Then, a basic fuel supply amount TI is determined according to the intake pipe absolute pressure PBA and the engine rotational speed NE at a step S14. Specifically, the basic fuel supply amount TI, which is a basic value of the fuel injection period TOUT, is determined by retrieving a TI map, not shown. The TI map is set such that the air-fuel ratio of a mixture supplied to the engine assumes a value almost equal to a stoichiometric air-fuel ratio in a predetermined operating condition of the engine determined by the intake pipe absolute pressure PBA and the engine rotational speed NE.

Then, a value of the engine coolant temperature TW detected by the TW sensor 18 is fetched at a step S15, and it is determined at a step S16 whether or not the engine coolant temperature TW is lower than 50° C. If TW<50° C. holds, which means that the engine 1 is cranking but warming-up thereof has not been completed yet, the fuel injection period TOUT of the fuel injection valve 6 is corrected to an increased value according to a degree of deterioration of fuel within the fuel tank 9 or an amount of low boiling point ingredients at steps S17 and S18. Where deteriorated fuel or fuel for use in summer containing a small amount of low boiling point ingredients is used under a condition of low engine temperature, the drivability of the engine 1 is degraded. The above correction is to avoid such degradation.

At the step S17, a fuel amount correction coefficient Kf is read from the memory circuit of the ECU 5 by executing a Kf-setting process of FIG. 5, described hereinafter, and at the step S18, the basic fuel supply amount TI determined at the step S13 is multiplied by the thus read fuel amount correction coefficient Kf to calculate the fuel injection period TOUT, followed by terminating the present routine.

On the other hand, if TW≧50° C. holds at the step S16, the program proceeds to a step S19, wherein the Kf value is set to 1.0, and the fuel injection period TOUT is calculated at the step S18, followed by terminating the present routine.

Figure 5:
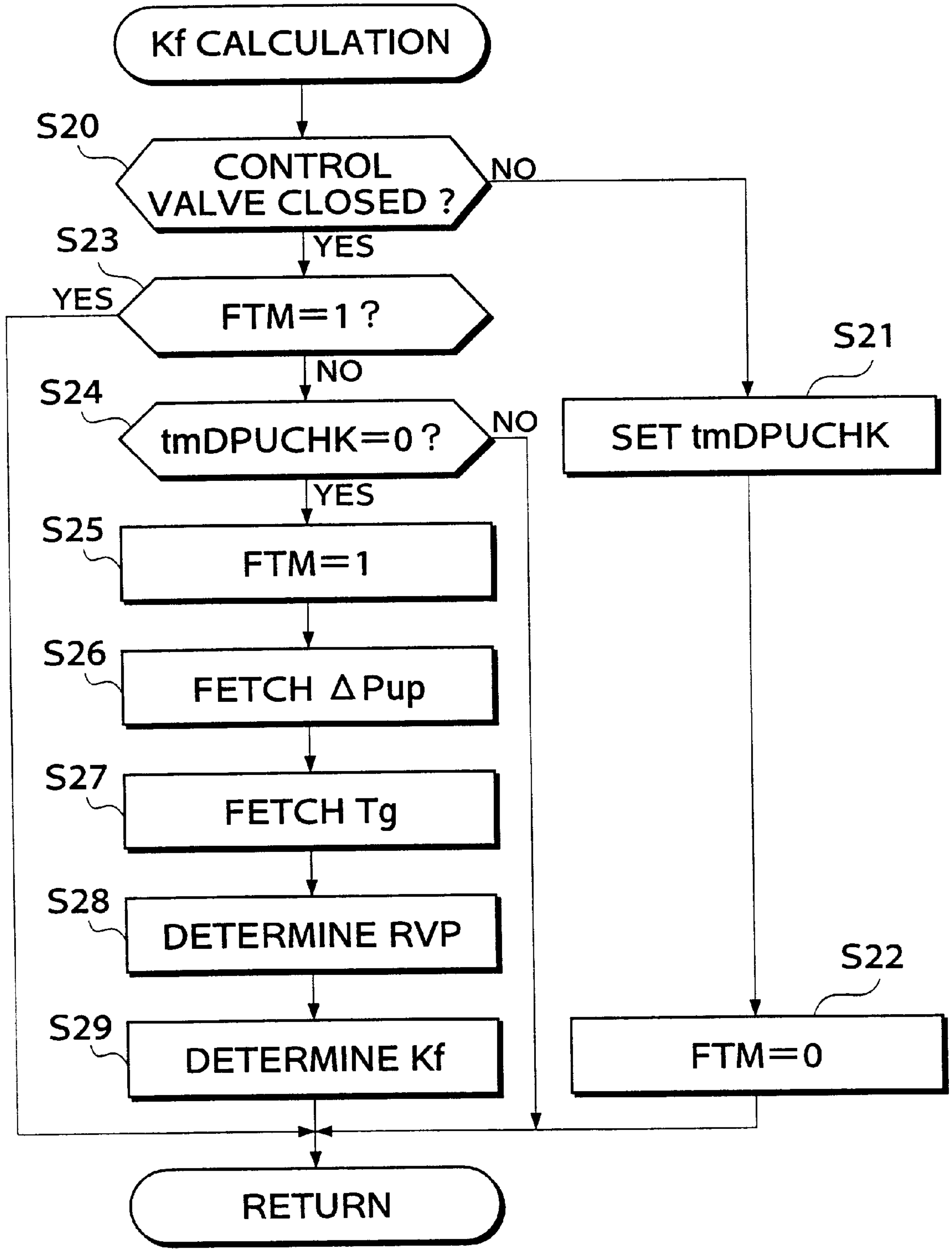
FIG. 5 is a flowchart showing a subroutine for determining a fuel amount correction coefficient Kf, which is executed at a step S17 in FIG. 4.

FIG. 5 shows a subroutine for calculating the fuel amount correction coefficient Kf, which is executed at the step S17 in FIG. 4. This subroutine is executed at predetermined time intervals.

First, at a step S20, it is determined whether or not the control valve 30 is closed. If the control valve 30 is open, it means that negative pressurization of the fuel tank 9 is being carried out by using negative pressure in the intake pipe 2, while if the control valve 30 is closed, it means that the fuel tank 9 is closed and hence negative pressurization of the same has been terminated.

If the control valve 30 is open at the step S20, a down-counting timer tmDPUCHK is set to a predetermined time period TDPUCHK (e.g. 5 min) and started at a step S21, and then a time lapse indication flag FTM is set to "0" at a step S22, followed by terminating the present routine. The time lapse indication flag FTM, when set to "1", indicates that the predetermined time period TDPUCHK has elapsed after closing of the control valve 30. The predetermined time period TDPUCHK indicates a time elapsed after completion of negative pressurization of the fuel tank 9, and when the time period TDPUCHK has elapsed, it indicates that it is timing for detecting an increase amount ΔPup of the tank internal pressure Pt.

If the control valve 30 is closed at the step S20, i.e. negative pressurization of the fuel tank 9 has been terminated, it is determined at a step S23 whether or not the flag FTM is set to "1". When this question is first made, FTM=0 holds, and then the program proceeds to a step S24, wherein it is determined whether or not the count value of the timer tmDPUCHK set at the step S21 is equal to 0. When this question is first made, tmDPUCHK>0 holds, and the program is immediately terminated. On the other hand, if the predetermined time period TDPUCHK has elapsed after termination of the negative pressurization of the fuel tank 9 and hence tmDPUCHK=0 holds, the flag FTM is set to "1" at a step S25, and then a value of the increase amount ΔPup of the tank internal pressure Pt detected by the Pt sensor 15 is fetched at a step S26, followed by fetching a value of the fuel temperature Tg in the fuel tank 9 detected by the Tg sensor 16 at a step S27.

Figure 6:
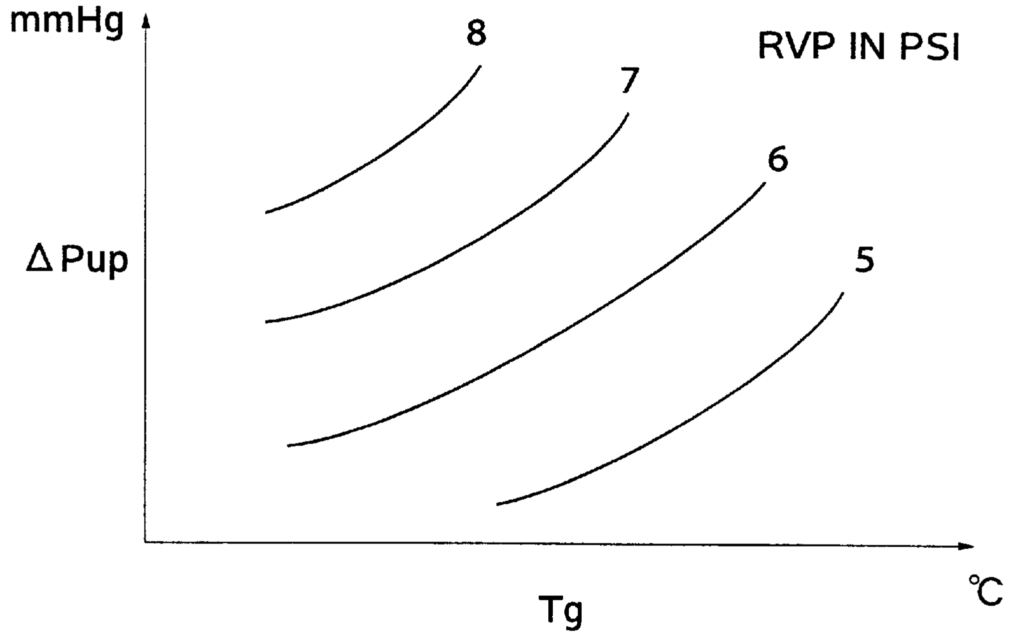
FIG. 6 shows a table for determining an RVP value according to an increase amount ΔPup of the pressure within the fuel tank after termination of negative pressurization of the fuel tank, and fuel temperature Tg.

Then, at a step S28, an RVP (Reid Vapor Pressure) table, shown in FIG. 6, is retrieved according to the increase amount ΔPup of the tank internal pressure Pt and the fuel temperature Tg. The RVP value represents saturation vapor pressure in psi measured at 100° F. (37.7° C.) and under a given condition. As fuel has a higher RVP value, it is more volatile. For example, the RVP value of regular gasoline is in a range from 9 to 13 exclusive. In FIG. 6, the RVP value is set to a larger value as the fuel temperature Tg is higher and/or the increase amount ΔPup of the tank internal pressure Pt is larger.

Figure 7:
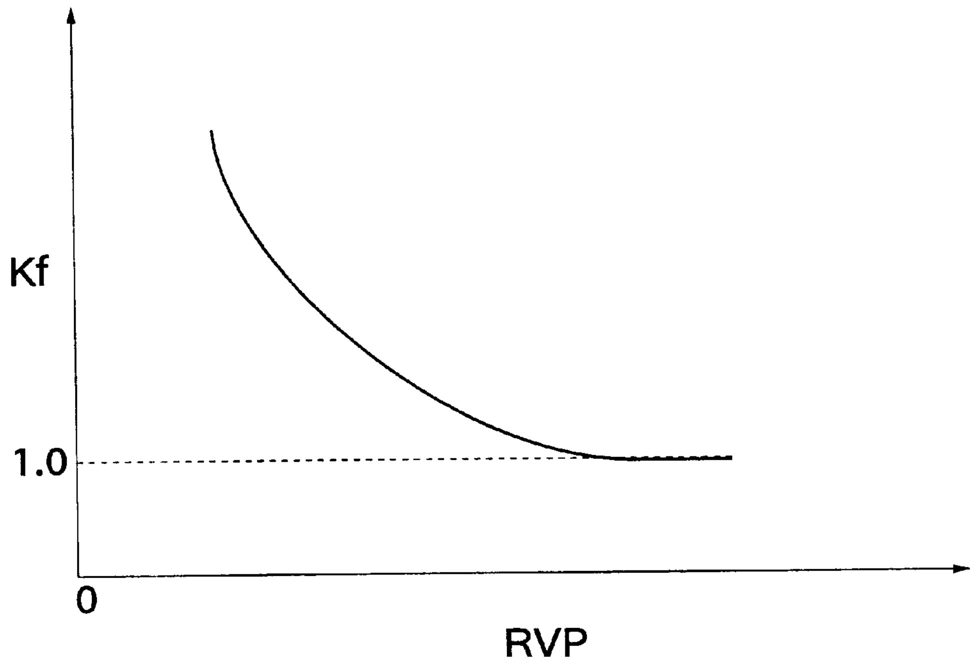
FIG. 7 shows a table for determining a fuel amount correction coefficient Kf according to the RVP value.

Further, at a step S29, a Kf table, shown in FIG. 7, is retrieved according to the above retrieved RVP value, to thereby determine the fuel amount correction coefficient Kf, and the Kf value thus determined is stored in the memory circuit of the ECU 5, followed by terminating the present routine. As shown in FIG. 7, the Kf value sharply increases as the RVP value approaches 0, while the Kf value approaches 1.0 as the RVP value becomes larger.

According to the process of FIG. 5 described above, when the predetermined time period TDPUCHK has elapsed after closure of the control valve 30, the fuel amount correction coefficient Kf is determined and stored in the memory circuit of the ECU 5.

According to the fuel supply amount control system of the present embodiment, the fuel injection period TOUT of the fuel injection valve 6 can be corrected to an increased value according to the degree of deterioration of fuel within the fuel tank 9. As a result, even when fuel within the fuel tank 9 is deteriorated or fuel for use in summer containing a small amount of low boiling point ingredients is used, the fuel amount to be supplied to the engine can be corrected to a value corresponding to the deterioration degree of fuel, to thereby secure required drivability of the engine.

Although in the present embodiment the increase of the fuel supply amount based on the increase amount Pup of the tank internal pressure Pt is carried out under a condition where the engine is cranking but warming-up thereof has not been completed yet, this is not limitative. The present invention is also applicable to conditions other than the above-mentioned condition.

What is claimed is:

1. An fuel supply amount control system for an internal combustion engine having a fuel tank, and an intake system, comprising:

an evaporative fuel passage extending between said fuel tank and said intake system;

a control valve arranged across said evaporative fuel passage, for opening and closing said evaporative fuel passage;

a pressure sensor for detecting pressure within said fuel tank;

negative pressurization control means for controlling opening of said control valve such that an interior of said fuel tank is held under negative pressure; and fuel supply amount control means for controlling an amount of fuel supplied to said engine;

said fuel supply control means being operable after termination of negative pressurization of said fuel tank by said negative pressurization control means, for increasing said amount of fuel supplied to said engine according to an amount of increase in said pressure within said fuel tank detected by said pressure sensor.

2. A fuel supply amount control system as claimed in claim 1, wherein said fuel supply amount control means increases said amount of fuel supplied to said engine by a larger amount as said amount of increase in said pressure within said fuel tank is smaller.

3. A fuel supply amount control system as claimed in claim 2, including a temperature sensor for detecting temperature of fuel within said fuel tank, said fuel supply amount control means increasing said amount of fuel supplied to said engine by a larger amount as said temperature of said fuel detected by said temperature sensor is lower.

4. A fuel supply amount control system as claimed claim 1, wherein said fuel supply amount control means carries out said increasing of said amount of fuel supplied to said engine during a time period after starting of said engine but before completion of warming-up of said engine.

5. A fuel supply amount control system as claimed in claim 2, wherein said fuel supply amount control means carries out said increasing of said amount of fuel supplied to said engine during a time period after starting of said engine but before completion of warming-up of said engine.

6. A fuel supply amount control system as claimed in claim 3, wherein said fuel supply amount control means carries out said increasing of said amount of fuel supplied to said engine during a time period after starting of said engine but before completion of warming-up of said engine.

* * * * *

UNITED STATES PATENT AND TRADEMARK OFFICE

CERTIFICATE OF CORRECTION

PATENT NO. : 6,053,036

DATED : April 25, 2000

INVENTOR(S) : Hajime UTO et al.

It is certified that error appears in the above-indentified patent and that said Letters Patent is hereby corrected as shown below:

Item [75] Inventors, change "Wako, Japan" to --Utsunomiya-shi, Japan--.

Item [30] Foreign Application Priority Data, change "9-20396" to --9-203968--.

Signed and Sealed this

Fifteenth Day of May, 2001

Attest:

Nicholas P. Godici

NICHOLAS P. GODICI

*Attesting Officer*

*Acting Director of the United States Patent and Trademark Office*